United States Patent
Shohara

(10) Patent No.: US 8,755,622 B2
(45) Date of Patent: Jun. 17, 2014

(54) IMAGE PROCESSING APPARATUS, IMAGE PROCESSING METHOD, AND PROGRAM

(75) Inventor: Makoto Shohara, Kokubunji (JP)

(73) Assignee: Canon Kabushiki Kaisha, Tokyo (JP)

(*) Notice: Subject to any disclaimer, the term of this patent is extended or adjusted under 35 U.S.C. 154(b) by 324 days.

(21) Appl. No.: 12/683,859

(22) Filed: Jan. 7, 2010

(65) Prior Publication Data

US 2010/0189350 A1  Jul. 29, 2010

(30) Foreign Application Priority Data

Jan. 28, 2009  (JP) .................. 2009-017128

(51) Int. Cl.
*G06K 9/00* (2006.01)
*G06K 9/36* (2006.01)

(52) U.S. Cl.
USPC .......................... 382/252; 382/166

(58) Field of Classification Search
USPC .......... 382/251–253, 162–167; 348/405, 414, 348/417, 418, 422
See application file for complete search history.

(56) References Cited

U.S. PATENT DOCUMENTS

| | | | | |
|---|---|---|---|---|
| 5,497,246 A * | 3/1996 | Abe | .................. | 382/252 |
| 2002/0039440 A1* | 4/2002 | Sakuyama | .................. | 382/166 |
| 2003/0038956 A1* | 2/2003 | Aotsuka | .................. | 358/1.9 |
| 2005/0185837 A1* | 8/2005 | Takano et al. | .................. | 382/162 |
| 2005/0276500 A1* | 12/2005 | Nakayama et al. | .................. | 382/251 |
| 2006/0197768 A1* | 9/2006 | Van Hook et al. | .................. | 345/546 |
| 2006/0215921 A1* | 9/2006 | Yokose et al. | .................. | 382/238 |
| 2008/0069466 A1* | 3/2008 | Lee et al. | .................. | 382/252 |

FOREIGN PATENT DOCUMENTS

JP   3399341   4/2003
JP   2008-071150 A   3/2008

OTHER PUBLICATIONS

The above foreign patent document was cited in the Jul. 12, 2013 Japanese Office Action, which is enclosed without an English Translation, that issued in Japanese Patent Application No. 2009-017128.

* cited by examiner

*Primary Examiner* — Amir Alavi
*Assistant Examiner* — Kenny Cese
(74) *Attorney, Agent, or Firm* — Cowan, Liebowitz & Latman, P.C.

(57) ABSTRACT

An image processing apparatus for tone conversion of a color image having s bit (s is an integer which is equal to or larger than 3) to a color image having d bit (d is an integer which is equal to or smaller than (s−2)) comprises: a conversion table generation unit configured to generate a conversion table, which varies in dependence on a tone value of the s bit, and has dispersion of which level varies in accordance with chroma and luminance of the color image; and a tone conversion unit configured to convert, before image compression or image file storage is performed and after color space conversion is performed, the color image having s bit to the color image having d bit using the conversion table.

12 Claims, 16 Drawing Sheets

FIG. 3

|   |   |   |   |   |   |   |   |   | 520 ↙ |
|---|---|---|---|---|---|---|---|---|---|

| R | G | R | G | R | G | R | G | R | G |
|---|---|---|---|---|---|---|---|---|---|
| G | B | G | B | G | B | G | B | G | B |
| R | G | R | G | R | G | R | G | R | G |
| G | B | G | B | G | B | G | B | G | B |
| R | G | R | G | R | G | R | G | R | G |
| G | B | G | B | G | B | G | B | G | B |

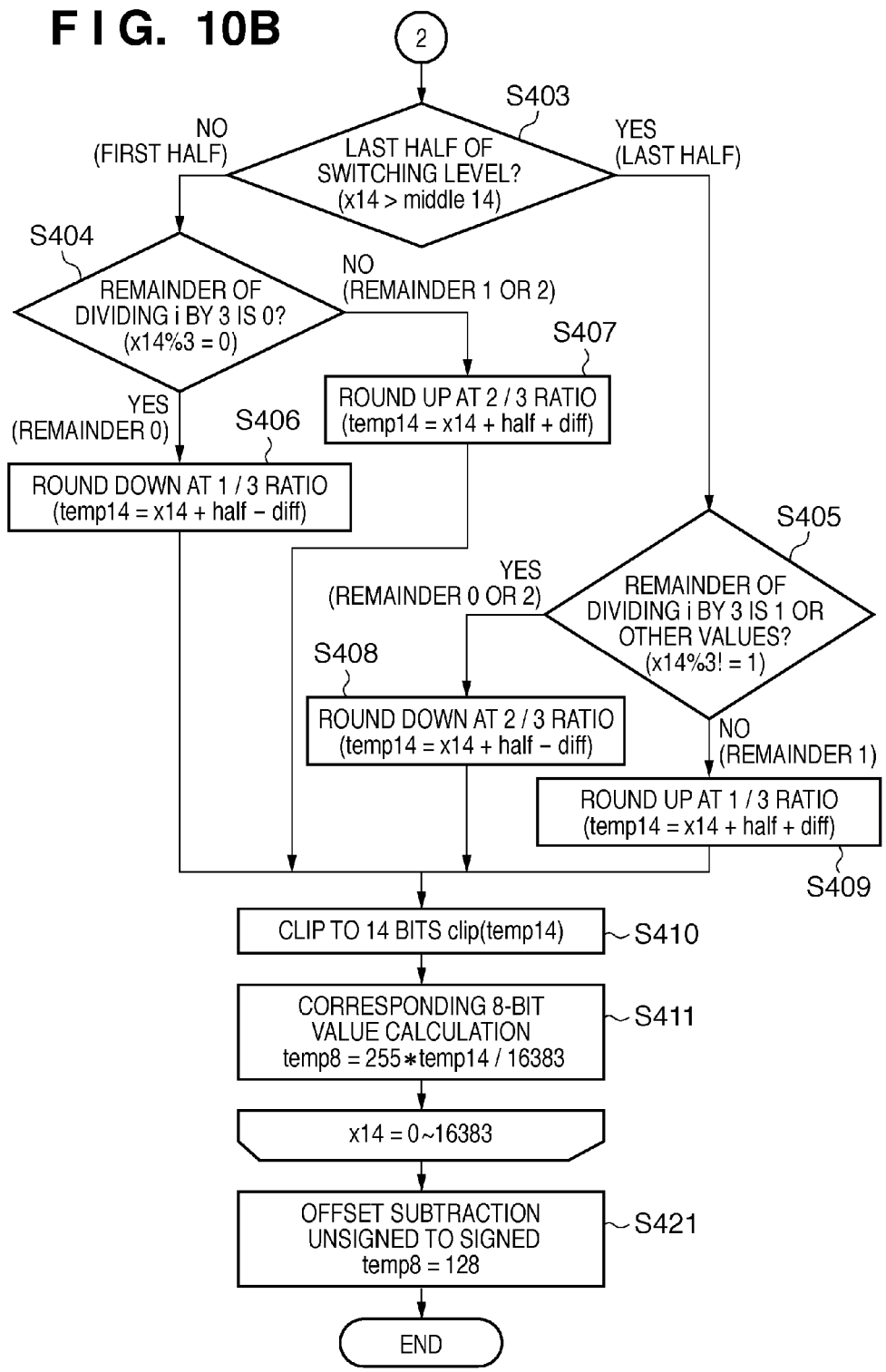

F I G. 13
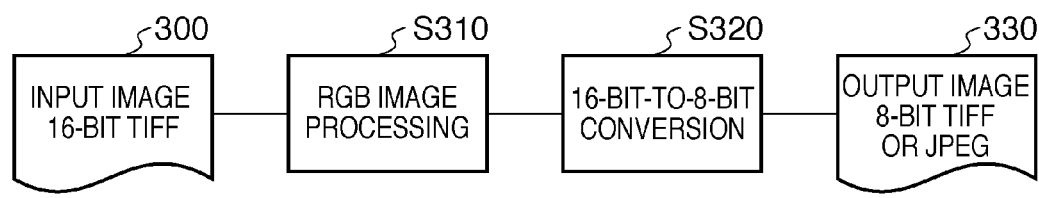

IMAGE PROCESSING APPARATUS, IMAGE PROCESSING METHOD, AND PROGRAM

BACKGROUND OF THE INVENTION

1. Field of the Invention

The present invention relates to a technique for reducing pseudo contours, which are generated on the occasion of changing bit precision in image tone quantization.

2. Description of the Related Art

Tone conversion is used for converting high-value bit precision to low-value bit precision or converting low-value bit precision to high-value bit precision. Among the conventional tone conversion methods, a simple bit-shifting method and an error diffusion method are known.

For instance, in a case where 16-bit-length signal sig16 is converted to 8-bit-length signal sig8 by bit shifting, the following calculation is simply performed.

$$sig8=((\text{unsigned long})sig16\&0xFF00)>>8$$

In this case, since the lower bits are lost, a stepwise signal is formed as shown in FIG. 15. Further in this case, while values ranging from 0 to 255 in the 16-bit signal are converted to 0 in the 8-bit signal, only the value 65535 in the 16-bit signal is converted to 255 in the 8-bit signal. Since conversion cannot be performed evenly, colors also change. If the following calculation is performed to round the values, the lack of evenness is improved, but still the formed signal remains stepwise.

$$sig8=((\text{unsigned long})sig16+128)\&0xFFF00)>>8$$

Meanwhile, an error diffusion method is known as a method of correcting pseudo contours which are generated in a case where tone quantization precision is low. When the error diffusion method is applied to conversion of 16-bit-length signal sig16 to 8-bit-length signal sig8, an error (err=sig16−sig8*256) generated in the conversion of 16-bit signal to 8-bit signal is diffused to peripheral pixels in a way that the local average values are uniform. However, this method has left a problem of persistent pseudo contours near the value ½ of converted one tone. There is a method which solves this problem (Japanese Patent No. 3399341). According to Japanese Patent No. 3399341, the way errors are given is changed in accordance with the tone level. However, both methods are adaptive processing where peripheral pixels are referred, and thus requiring relatively a large amount of branch instructions and calculations.

In a case where an object of shooting includes a blue sky or photographic gradation in a studio, changes in the tones are extremely gradual. When such object is photographed, in an often-used image where the tone quantization value is 8-bit length, there are cases that pseudo contours are generated and perceived as a tone jump in colors or luminance of the gradation part of the image. If this occurs particularly under a low-noise condition, for example, low ISO sensitivity, the pseudo contours can be reduced by improving the tone conversion method which is performed after image processing is performed at high-bit precision, for example, 16-bit length. Among the conventional tone conversion methods, bit shifting cannot solve the problem of pseudo contours, and error diffusion requires a large amount of calculations, a large circuit size, and a lot of processing time.

SUMMARY OF THE INVENTION

The present invention has been proposed in view of the above-described problems, and made to reduce, with a simple configuration, pseudo contours which are generated on the occasion of changing bit precision in tone quantization.

According to the first aspect of the present invention, there is provided an image processing apparatus for tone conversion of a color image having s bit (s is an integer which is equal to or larger than 3) to a color image having d bit (d is an integer which is equal to or smaller than (s−2)), comprising a conversion table generation unit configured to generate a conversion table, which varies in dependence on a tone value of the s bit, and has dispersion of which level varies in accordance with chroma and luminance of the color image, and a tone conversion unit configured to convert, before image compression or image file storage is performed and after color space conversion is performed, the color image having s bit to the color image having d bit using the conversion table.

According to the second aspect of the present invention, there is provided an image processing method of tone conversion of a color image having s bit (s is an integer which is equal to or larger than 3) to a color image having d bit (d is an integer which is equal to or smaller than (s−2)), comprising the steps of generating a conversion table, which varies in dependence on a tone value of the s bit, and has dispersion of which level varies in accordance with chroma and luminance of the color image, and converting, before image compression or image file storage is performed and after color space conversion is performed, the color image having s bit to the color image having d bit using the conversion table.

Further features of the present invention will become apparent from the following description of exemplary embodiments with reference to the attached drawings.

BRIEF DESCRIPTION OF THE DRAWINGS

FIG. 3 is a view showing a RGB pixel arrangement;

FIGS. 10A and 10B are flowcharts describing 14-bit-to-8-bit conversion LUT generation control;

FIG. 13 is a flowchart describing general image processing of RGB;

DESCRIPTION OF THE EMBODIMENTS

Embodiments of the present invention will now be described in detail with reference to the accompanying drawings.

First Embodiment

The first embodiment describes a case where YCbCr 14-bit color image data is converted to 8-bit image data in image processing of a digital camera. Assume that the number of bits of the color image before tone conversion is performed is s bits (s is an integer which is equal to or larger than 3), and the number of bits of the color image after tone conversion is performed is d bits (d is an integer which is equal to or smaller than (s−2)).

Figure 1:
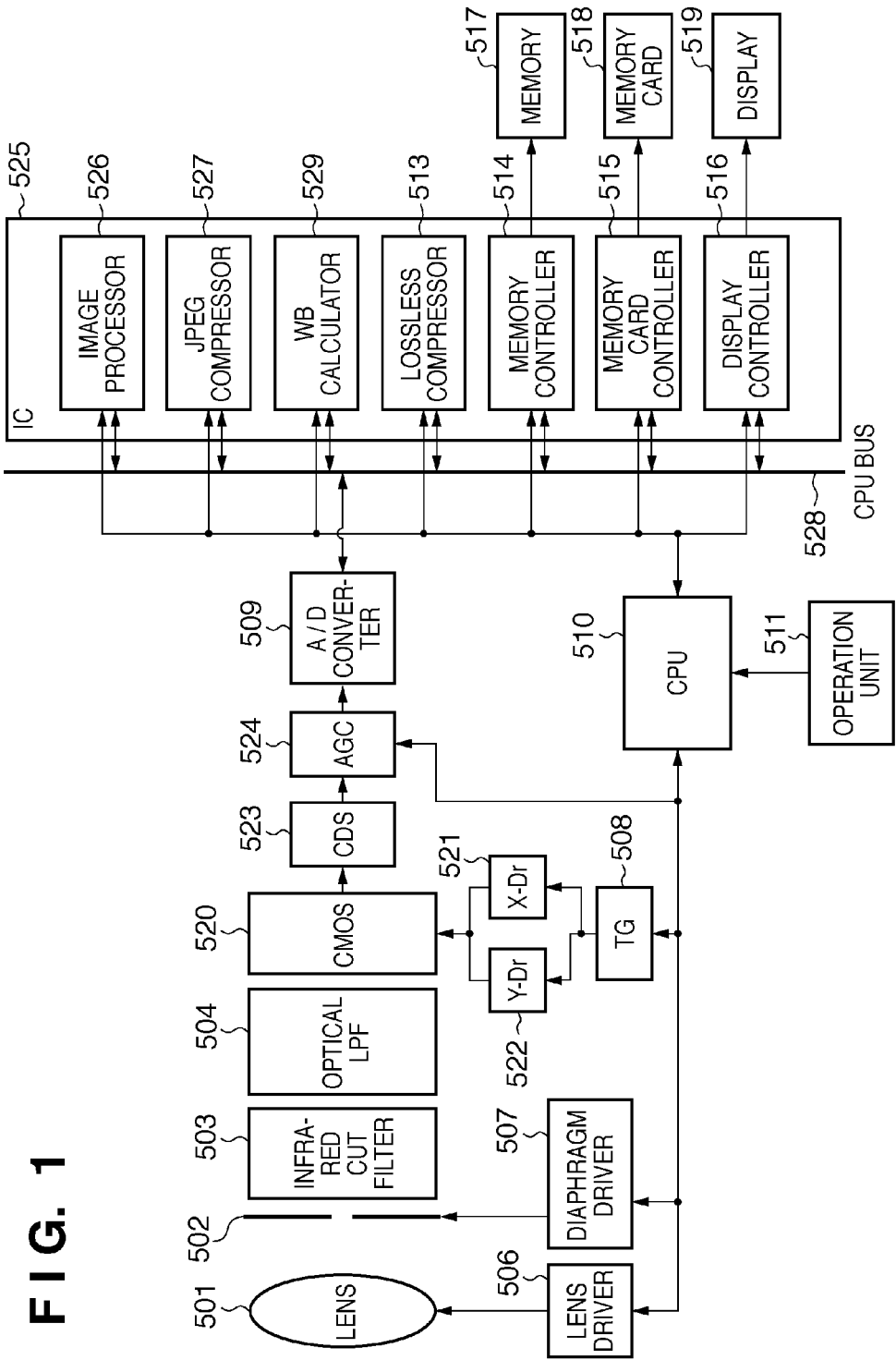
FIG. 1 is a block diagram showing a configuration of a digital camera according to the first embodiment of the present invention.

FIG. 1 is a block diagram showing a configuration of a digital camera according to the first embodiment of the present invention.

Light that has passed through a lens 501 is subjected to light amount adjustment by a diaphragm 502, and passes through an infrared cut filter 503 and an optical low-pass filter (LPF) 504. Then, an image is formed on an image sensing device 520 (hereinafter referred to as a CMOS). Note that numeral 506 denotes a lens driver for driving a zoom lens, a focus lens and so forth which constitute the lens 501. Numeral 507 denotes a diaphragm driver for driving the diaphragm 502.

On the photoreceptive surface of the CMOS 520, photoelectric conversion sensors utilizing photodiode are two-dimensionally arranged. For each sensor, one primary color filter, for example, red (R), green (G), or blue (B), is provided in a predetermined arrangement. Note in the present embodiment, although light is separated into three color components R, G, and B by the color filter, it is possible to use plural image sensors (e.g., three sensors) and assign one color to each image sensor.

The light which has formed an image on the CMOS 520 is converted to electric charges, the amount of which corresponds to the amount of incident light. A signal generated by a timing generator 508 is supplied to a horizontal reference pulse generation driver 522 and a vertical reference pulse generation driver 521. Pixels to be read by the CMOS 520 are selected by the horizontal reference pulse generation driver 522 and vertical reference pulse generation driver 521. Charges that are stored in the selected pixel sensors are converted to voltage signals and output from the CMOS 520.

The voltage signals outputted by the CMOS 520 are sampled by a correlated double sampling circuit 523 (hereinafter referred to as a CDS), amplified in accordance with the ISO sensitivity by an AGC circuit 524, and quantized in 14-bit precision to be converted to digital signals by an A/D converter 509.

The image data converted to the digital signals is inputted to an image processing IC 525, where a white balance gain is calculated by a WB calculator 529 and stored in memory 517 controlled by a memory controller 514.

The image data converted to the digital signals is inputted to a lossless compressor 513 which performs lossless compression. The image data is subjected to lossless compression by the lossless compressor 513, and the lossless-compressed RAW data is stored as a RAW-format file in a memory card 518, which is controlled by a memory card controller 515, through a CPU bus 528.

The image data converted to the digital signals is also inputted to an image processor 526. The RGB image data is converted to YCbCr signals (CCIR601), in which each color has 8 bits, by the image processor 526, and also subjected to raster-block conversion, and then JPEG compression is performed by a JPEG compressor 527. The JPEG-format image data outputted by the JPEG compressor 527 is stored as a JPEG-format file in the memory card 518, which is controlled by the memory card controller 515, through the CPU bus 528.

Note in FIG. 1, numeral 510 denotes a CPU for controlling the overall operation of the digital camera, and numeral 511 denotes an operation unit where a user inputs various instructions to the CPU. Numeral 519 denotes a display which performs various displaying in accordance with the control of a display controller 516.

Hereinafter, image processing executed by the image processor 526 is described further in detail.

Figure 2:
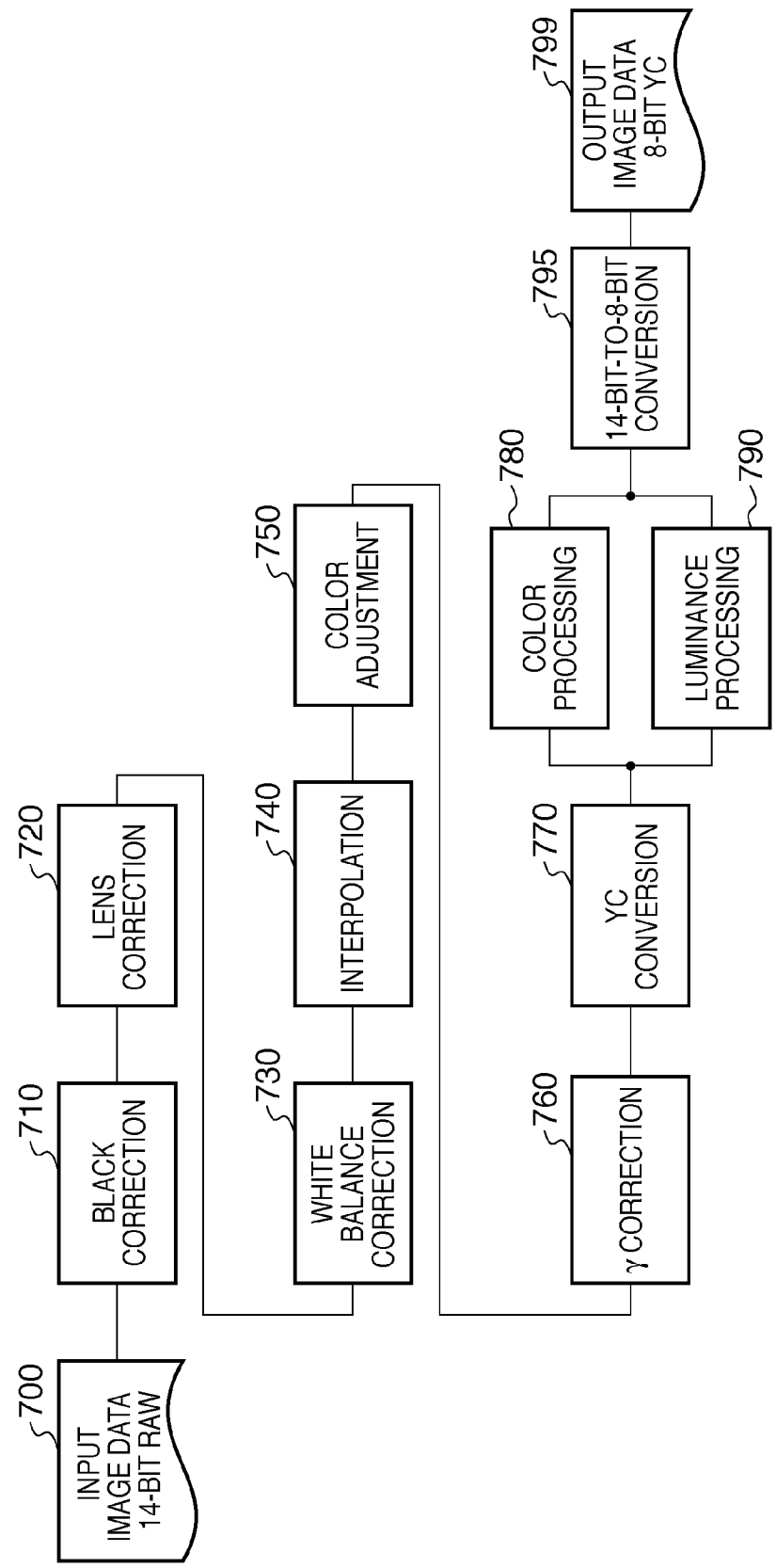
FIG. 2 is a block diagram showing a brief of image processing executed by an image processor.

FIG. 2 is a block diagram showing a brief of the image processing executed by the image processor 526.

The 14-bit digital image data input from the memory 517 is input to a black correction circuit 710. The black correction circuit 710 approximately estimates backlight bleeding caused by dark currents based on the accumulated average value of image data in the coordinate region of the CMOS light-shielding area, and subtracts the accumulated average value from the image data. The image data, from which black has been subtracted by the black correction circuit, is subjected to signal amplification by a lens correction circuit 720 for the reduced amount of signals which have been caused by the reduced light in the lens' periphery. Thereafter, lens' magnification chromatic aberration is corrected by performing enlargement/reduction for each color.

The image data which has been subjected to lens correction by the lens correction circuit 720 is input to a white balance correction circuit 730 for white balance correction. The white balance correction circuit 730 multiplies the image data by a white balance coefficient calculated by the CPU 510 based on the data that has been calculated in advance by the WB calculator 529. Alternatively, it is possible to multiply the image data by a coefficient of a pre-set white balance (e.g., daylight, tungsten light, fluorescent light and so forth). The image data, on which white balance has been corrected by the white balance correction circuit 730, is then subjected to color interpolation by the color interpolation circuit 740. In the color interpolation circuit 740, R, G, and B planes (R, G, and B components) are generated from the pattern data (e.g., Bayer pattern) in which R (red), G (green), and B (blue) data are arrayed in matrix as shown in FIG. 3.

Next, the image data in R, G, and B planes are subjected to color optimization by a color adjustment circuit 750 using, for example, 3×3 matrix calculation in equation (1).

$$Rc = m11 \times R + m12 \times G + m13 \times B$$

$$Gc = m21 \times R + m22 \times G + m23 \times B$$

$$Bc = m31 \times R + m32 \times G + m33 \times B \quad (1)$$

Herein, m11 to m33 in equation (1) are optimization coefficients. After the color adjustment, the image data is subjected to gamma conversion by a gamma correction circuit 760 using equation (2).

$$R\gamma = \gamma(Rc)$$

$$G\gamma = \gamma(Gc)$$

$$B\gamma = \gamma(Bc) \quad (2)$$

Next, the gamma-converted image data is converted from the RGB signals to luminance-component and color-difference-component signals YCbCr as shown in equation (3) by the YC converter 770 for pseudo-color processing and edge enhancement.

$$Y14=k11\times Rc+k12\times Gc+k13\times Bc$$

$$Cb14=k21\times Rc+k22\times Gc+k23\times Bc$$

$$Cr14=k31\times Rc+k32\times Gc+k33\times Bc \quad (3)$$

K11 to k33 in equation (3) are coefficients for YCbCr conversion.

When a regular JPEG image is to be generated, the luminance component Y14 of the converted signals YCbCr is subjected to edge enhancement in the luminance processor 790. The color-difference components Cb14 and Cr14 of the converted signals YCbCr are subjected to median filtering in the color processor 780. Last, the adjusted data YCbCr is converted to 8-bit data 799 by the 14-bit-to-8-bit conversion processor 795, and subjected to JPEG compression (image compression) by the JPEG compressor 527.

Hereinafter, the 14-bit-to-8-bit conversion processor 795 is described further in detail.

The 14-bit YCbCr data Y14, Cb14, and Cr14 are converted to 8-bit data by the 14-bit-to-8-bit conversion processor 795 using a LUT (look-up table, also referred to as a conversion table) shown in equation (4). A generation method of the LUT (conversion table generation method) used in this step will be described later.

$$Y8=YLUT(Y14)$$

$$Cb8=CbLUT(Cb14)$$

$$Cr8=CrLUT(Cr14) \quad (4)$$

The YLUT trisects the 14-bit tone value in accordance with the remainder of 3, and changes the round-up or round-down ratio in the first half and last half of the 14-bit value where the 8-bit tone value switches, thereby achieving the pseudo-contour reduction effect. Rounding up or rounding down is performed by adding (rounding up) or subtracting (rounding down) a dispersion amount (diff) to or from the 14-bit value. The dispersion amount (diff) is changed in dependence on the tone value of the 14-bit value. Also for the CbLUT and CrLUT, the LUT having dispersion is used. When tones change gradually in the 14-bit level, the converted image data can have three-level pseudo halftones in local areas, and therefore, pseudo-contour occurrence can be reduced.

First, the generation method of the YLUT in equation (4) is described.

Figure 4A:
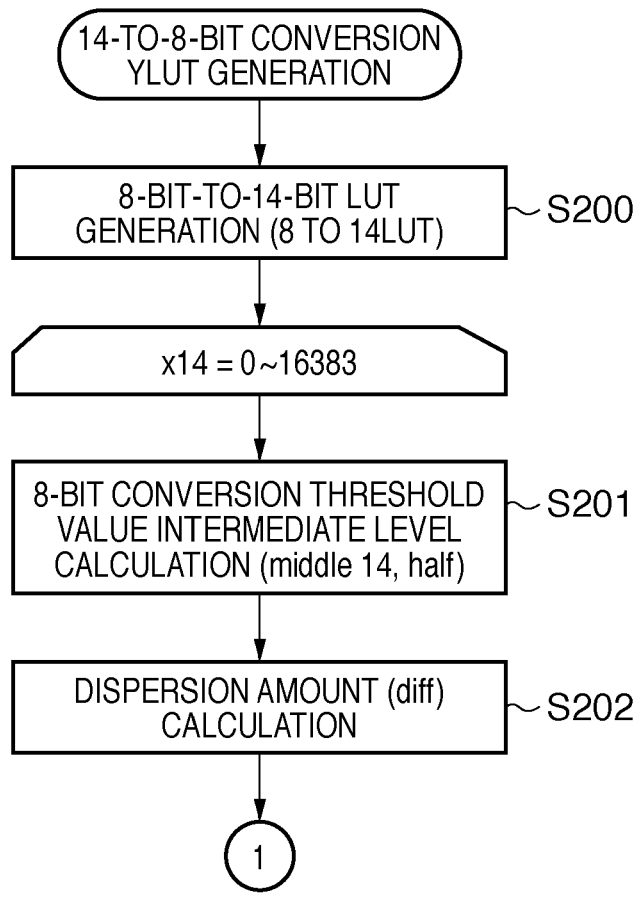
FIGS. 4A and 4B are flowcharts describing 14-bit-to-8-bit conversion LUT generation control.
Figure 4B:
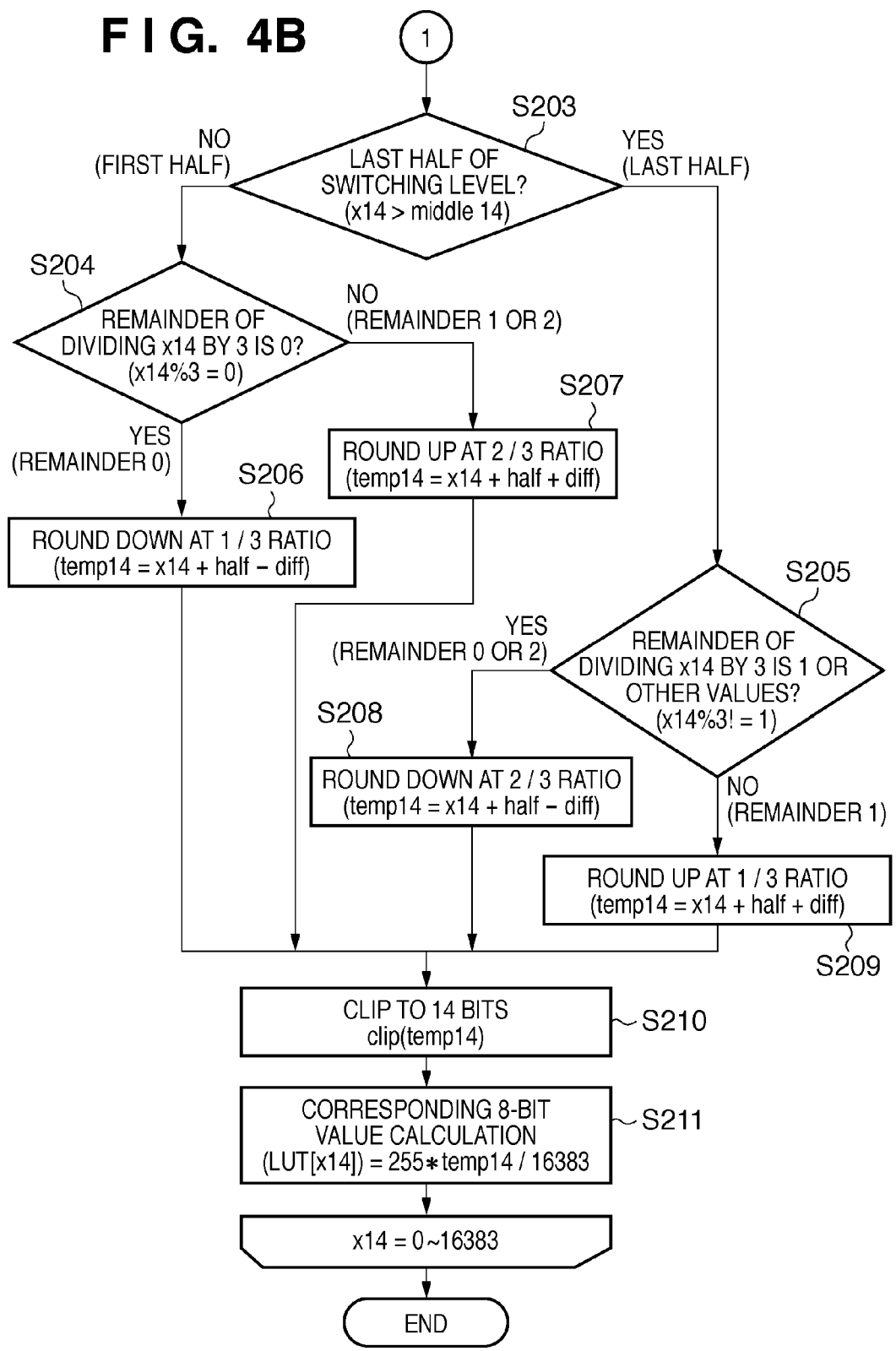

The YLUT is generated by the control flow shown in FIGS. 4A and 4B. First, in 8-bit-to-14-bit LUT (8 to 14 LUT) generation step S200, a LUT which is to be used in the 8-bit conversion threshold value intermediate level calculation step S201 is generated. This LUT is a simple 8-bit-to-14-bit conversion LUT, and is calculated by following equation. In the following equation, i is a value between 0 to 255, and rounding down is adopted in division.

$$8\text{ to }14\,LUT[i]=(i*16383+127)/255$$

Next, steps S201 to S211 are performed with respect to all the 14-bit values. In 8-bit conversion threshold value intermediate level calculation step S201, the 8-bit conversion threshold value intermediate level (middle14), which corresponds to the target 14-bit value, is obtained as shown in FIG. 5.

Figure 5:
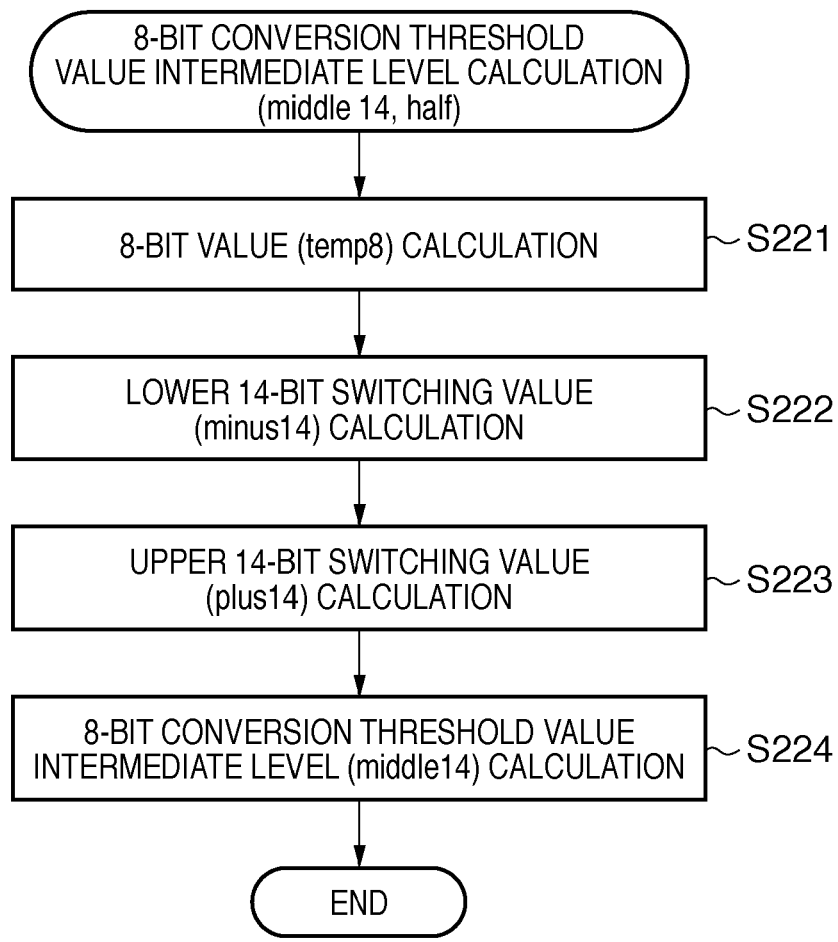
FIG. 5 is a flowchart describing 8-bit conversion threshold value intermediate level calculation control.

The flow in FIG. 5 is described with reference to FIG. 6, using an example where 14-bit value (x14) is 200 (x14=200).

Figure 6:
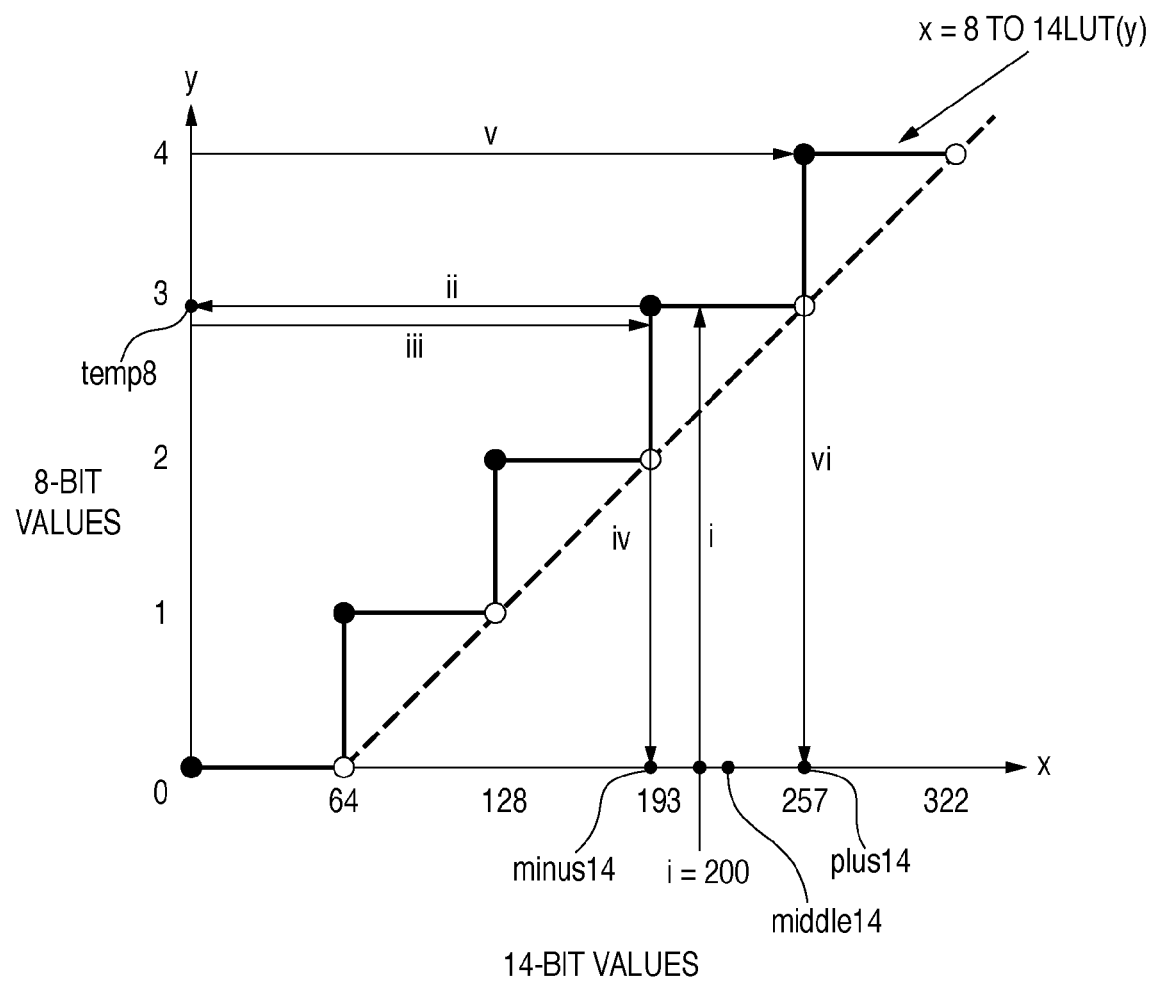
FIG. 6 is a graph showing 8-bit conversion threshold value intermediate level calculation control.

In 8-bit value (temp8) calculation step S221 in FIG. 5, a value corresponding to temp8 in FIG. 6 is obtained. With the use of the 8-to-14 LUT acquired in the 8-bit-to-14-bit LUT (8to14LUT) generation step S200, temp8 is obtained by y−1, wherein y is the value obtained when x first exceeds i among the values of x=8to14 LUT[y] being searched from the smallest y. In the example shown in FIG. 6, temp8=3. Next, in the lower-14-bit switching value (minus14) calculation step S222, a value minus14 is obtained as in minus14=8to14LUT (temp8). In the example shown in FIG. 6, minus14=193. Similarly in the upper-14-bit switching value (plus14) calculation step S223, a value plus14 is obtained as in plus14=8to14LUT(temp8+1). In the example shown in FIG. 6, plus14=257. Next in the 8-bit conversion threshold value intermediate level (middle14) calculation step S224, a value middle14 is obtained by equation (5).

$$\text{half}=(\text{plus}14-\text{minus}14)/2$$

$$\text{middle}14=\text{minus}14+\text{half} \quad (5)$$

Next, a dispersion amount diff is obtained in the dispersion amount (diff) calculation step S202. The dispersion amount (diff) is an offset used for rounding up or rounding down the 14-bit value. In general rounding of a value, 0.5 is added and rounded down; however, in this embodiment the value is rounded by adding (rounding up) or subtracting (rounding down) the calculated dispersion amount. In a case of performing 14-bit-to-8-bit conversion by rounding, 14-bit value 16383/255*0.5=32 which is equivalent to 0.5 in 8-bit value is added to the 14-bit value and rounding down is performed. Herein, the dispersion amount is maxDiff=32 in the maximum value of 14-bit value. To control the dispersion amount (diff) so as not to have an error equal to or larger than an error generated by rounding, equation (6) is used.

$$\text{Diff}(x14)=x14*a\text{Diff}/16383+\text{minDiff}$$

$$a\text{Diff}=\text{maxDiff}-\text{minDiff} \quad (6)$$

Herein, maxdiff and minDiff are parameters which can control the dispersion amount. For instance, the following values are set.

maxDiff=32 (initial value): a constant that determines the level of the dispersion amount (14 bit, maximum value)

minDiff=8 (initial value): a constant that determines the level of the dispersion amount (14 bit, minimum value)

Steps S203 to S209 are performed using the values obtained so far. In the switching level last-half determination step S203, whether the target value x14 is larger or smaller than middle14 is determined. In steps S204 and S205, the control is divided into two in accordance with the remainder obtained by dividing x14 by 3. By executing the control described in steps S206 to S209 respectively, the 14-bit tone value is trisected in accordance with the remainder of 3, and the round-up or round-down ratio is changed in the first and last half of the 16-bit value where the 8-bit tone value switches. The round-up and round-down ratios are changed by adding (rounding-up) or subtracting (rounding-down) the dispersion amount (diff) to or from the 16-bit value, and the dispersion amount (diff) is changed in dependence on the tone value of the 16-bit value.

Figure 7:
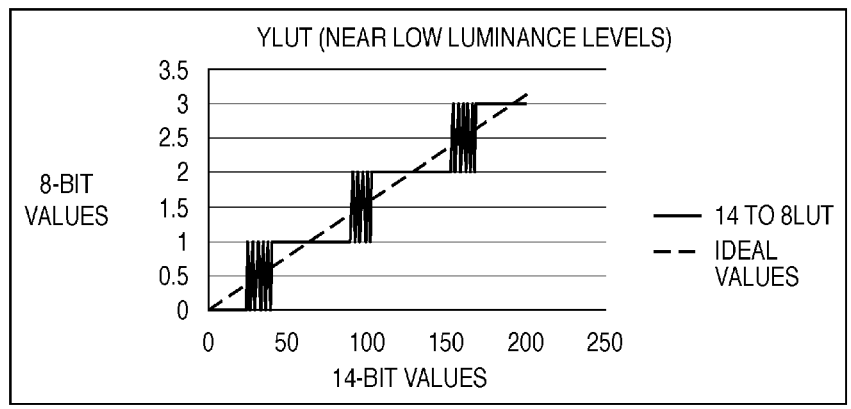
FIG. 7 is a view showing 14-bit-to-8-bit conversion near low luminance levels.
Figure 8:
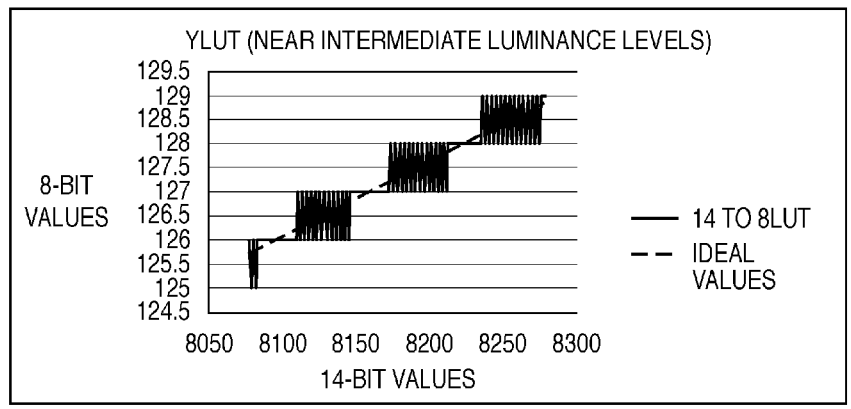
FIG. 8 is a view showing 14-bit-to-8-bit conversion near intermediate luminance levels.
Figure 9:
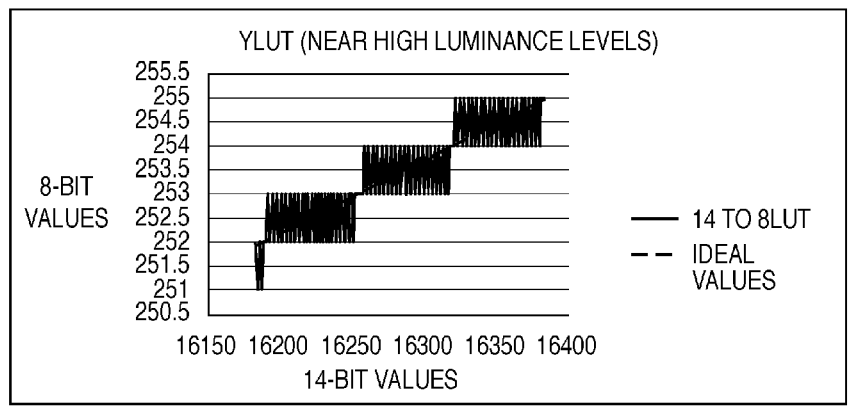
FIG. 9 is a view showing 14-bit-to-8-bit conversion near high luminance levels.

By virtue of the above-described processing, when tones change gradually in the 16-bit level, the converted image data can have three-level pseudo halftones in local areas. Therefore, occurrence of pseudo contours of luminance can be reduced. An example of YLUT generated in the above-described manner is shown in FIGS. 7 to 9. The 14-to-8 LUTs in FIGS. 7 to 9 are generated in accordance with the flowchart in FIGS. 4A and 4B. The ideal values are obtained in a case where continuous values (values smaller than the decimal point) can be used. The higher the luminance, the larger area the 14-bit values disperse.

Next, the generation method of CbLUT and CrLUT in equation (4) is described.

Figure 10A:
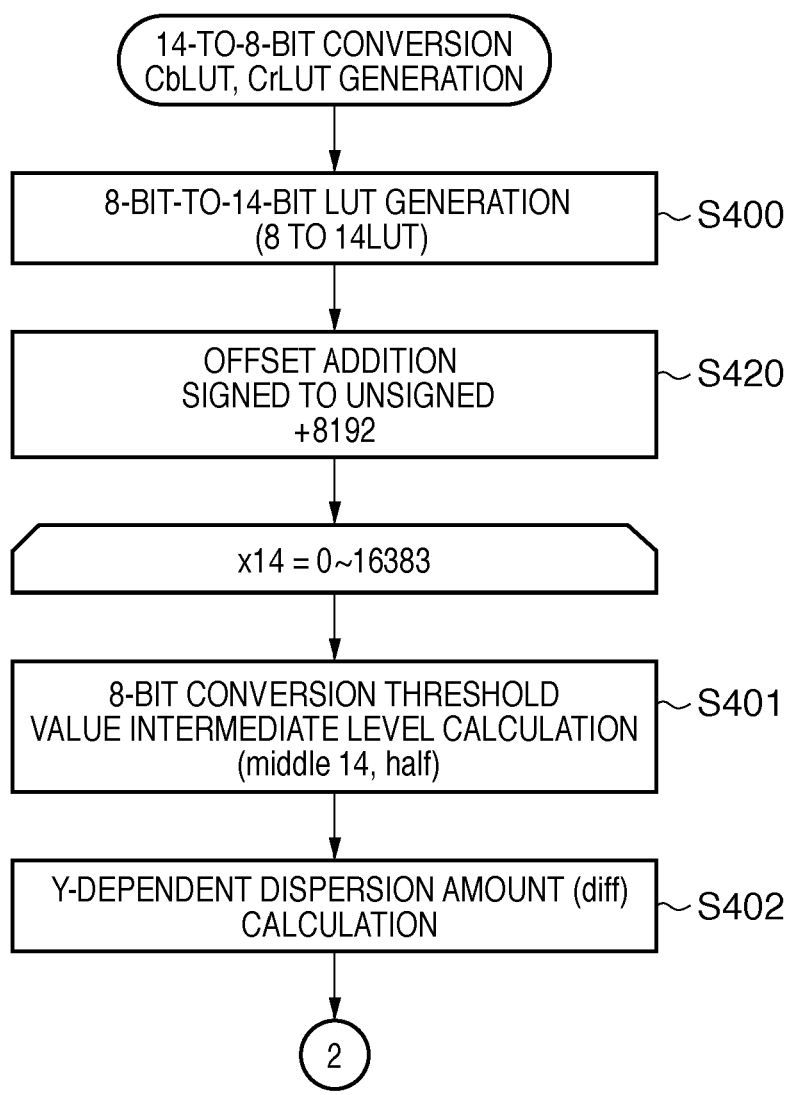

CbLUT and CrLUT are generated by the control flow shown in FIGS. 10A and 10B. Basically, it is the same as the case of YLUT. While the value of x14 is the value of Y in FIGS. 4A and 4B, the value of Cb is used in CbLUT generation and the value of Cr is used in CrLUT generation. Also, the following points differ from FIGS. 4A and 4B. First, since Cb and Cr take negative values, offset addition step S420 and offset subtraction step S421 are added. Secondly, the dispersion amount (diff) calculation step is changed to Y-dependent dispersion amount (diff) calculation step S402.

Hereinafter, the Y-dependent dispersion amount (diff) calculation step S402 is described in detail. The Cb (Cr) dispersion amount (diff_Cb (diff_Cr)) is calculated by equation (7) using the value of luminance Y.

$$\text{diff\_}Cb(x14)=Y14*a\text{Diff\_}Cb/16383+\text{minDiff\_}Cb$$

$$\text{diff\_}Cr(x14)=Y14*a\text{Diff\_}Cr/16383+\text{minDiff\_}Cr \quad (7)$$

$$a\text{Diff\_}Cb=\text{maxDiff\_}Cb-\text{minDiff\_}Cb$$

$$a\text{Diff\_}Cr=\text{maxDiff\_}Cr-\text{minDiff\_}Cr$$

Herein, maxDiff_Cb, minDiff_Cb, and maxDiff_Cr, and minDiff_Cr are parameters which can control the dispersion amount. Since red is particularly perceived well in the dark part, Cr is set so as to have large dispersion even in the dark part. Further, since blue has high contribution to colors, Cb is set so as to have large dispersion throughout the entire areas of luminance. For instance, the following values are set.

maxDiff_Cb=16383/255*0.5=32 (initial value, 14 bit, maximum value of dispersion amount)

minDiff_Cb=maxDiff_Cb/4=8 (initial value, 14 bit, minimum value of dispersion amount)

maxDiff_Cr=16383/255*0.5=32 (initial value, 14 bit, maximum value of dispersion amount)

minDiff_Cr=maxDiff_Cb=32 (initial value, 14 bit, minimum value of dispersion amount)

Other steps in FIGS. 10A and 10B are executed similarly to the steps for YLUT in FIGS. 4A and 4B, and CbLUT and CrLUT are generated. R pixel noise becomes conspicuous because it is multiplied by a large gain of the white balance gain, and is amplified by the gamma curb. Moreover, the noise is spatially enlarged by image processing such as noise reduction. By having large dispersion in the dark part red (Cr), an effect of noise diffusion can be achieved. With respect to blue (Cb), since the value largely affects the color difference, values are dispersed in as large area as possible.

Second Embodiment

The second embodiment describes RAW development (YCbCr, 16-bit-to-8 bit conversion) in a personal computer (PC).

Figure 11:
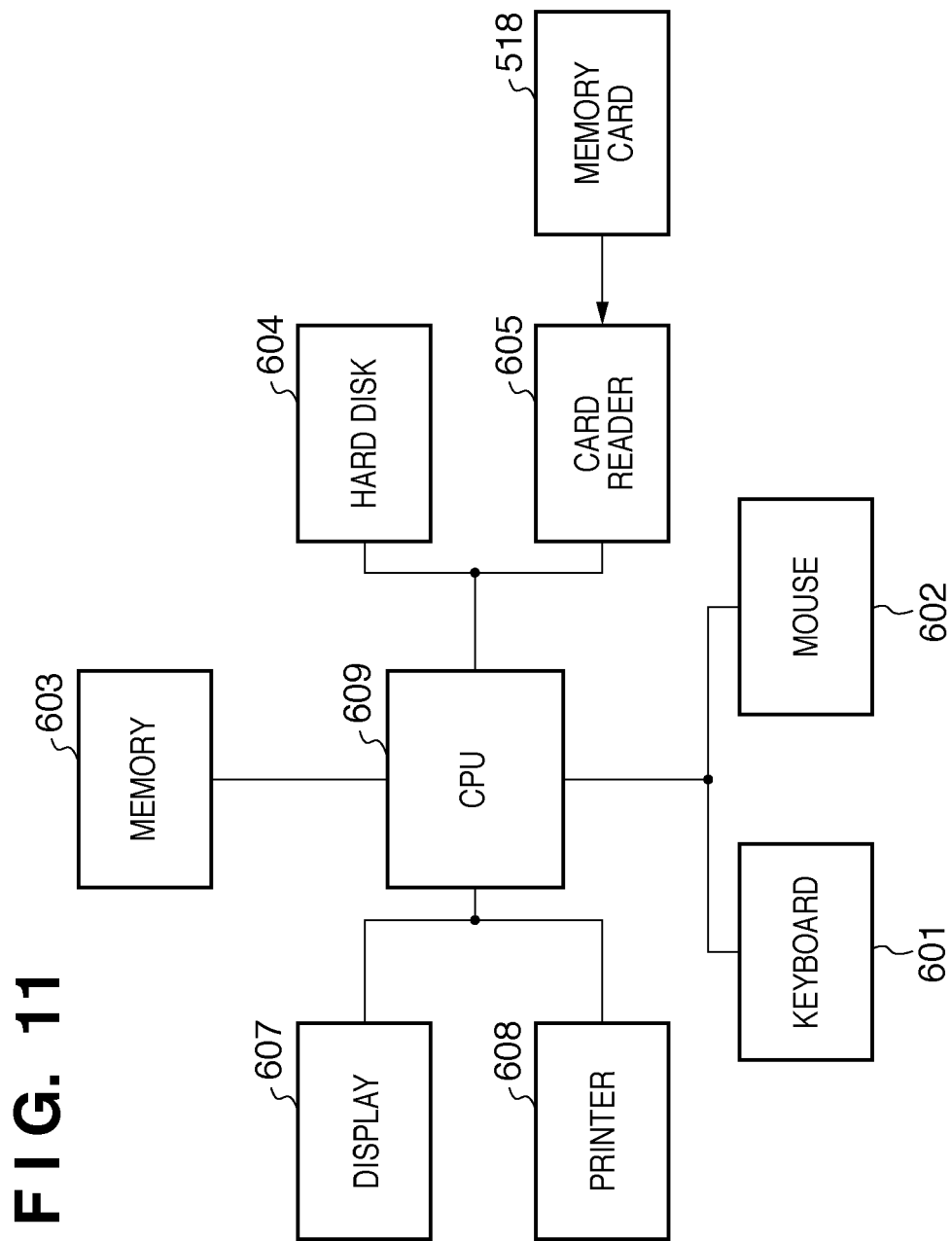
FIG. 11 is a block diagram showing a configuration of an information processing apparatus according to the second embodiment of the present invention.

FIG. 11 is a block diagram showing a configuration of an information processing apparatus according to the second embodiment of the present invention. For an information processing apparatus, a general personal computer (PC) can be used.

In FIG. 11, a CPU 609 realizes respective processing by executing programs stored in memory 603. Stored in a hard disk 604 are the basic input/output system and programs of the information processing apparatus. The programs are read from the hard disk 604 to the memory 603 and executed. A display 607 performs various displaying under the control of the CPU 609. An information processing apparatus user operates the apparatus with the use of the keyboard 601 and mouse 602. A card reader 605 enables a digital camera's memory card 518 to be inserted. RAW-format or JPEG-format image files recorded in the memory card 518 can be stored in the memory 603 or hard disk 604. A printer 608 prints various data and images under the control of the CPU 609. Described hereinafter is an application program which processes a RAW-format image file generated by the aforementioned digital camera.

Figure 12:
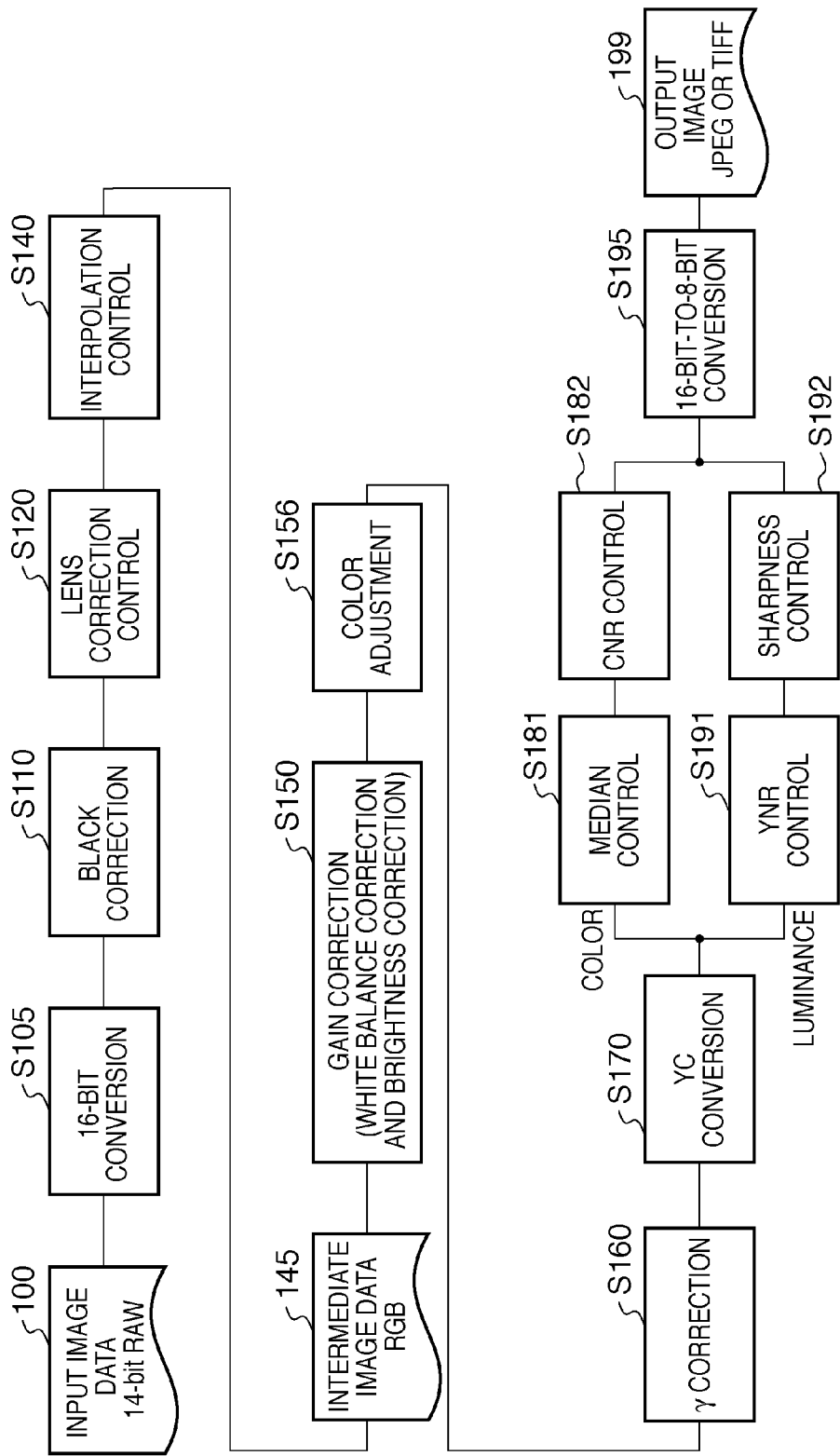
FIG. 12 is a flowchart describing image processing in the information processing apparatus.

FIG. 12 is an image processing flow of an application program for processing a RAW-format image file, which is executed by the information processing apparatus. RAW-format image data 100 is read from the hard disk 604 or card reader 605, subjected to 16-bit conversion by 16-bit conversion control (step S105), and inputted to black correction control (step S110). In the black correction control (step S110), backlight bleeding caused by dark currents is estimated (OB value) based on the accumulated average value of image data in the coordinate region of the CMOS light-shielding area, and the OB value is subtracted from the image data. The image data, from which black has been subtracted by the black correction control (step S110), is subjected to signal amplification in the lens correction control for the reduced amount of signals which have been caused by the reduced light in the lens' periphery. Thereafter, lens' magnification chromatic aberration is corrected by performing enlargement/reduction for each color. The image data which has been subjected to lens correction in the lens correction control (step S120) is input to interpolation control (step S140) for color interpolation. In the interpolation control (step S140), R, G, and B planes (R, G, and B) are generated from the pattern data (e.g., Bayer pattern) in which R (red), G (green), and B (blue) data are arrayed in matrix as shown in FIG. 3. Next, the image data in R (R component), G (G component), and B (B component) planes are stored temporarily as intermediate image data 145 in the memory 603. The processing so far can be performed without depending on the application's user-designated image processing setting values, user-designated white balance setting value, user-designated brightness adjustment setting value, and so forth. Processing that depends upon the user-designated image processing setting values is performed based on the intermediate image data 145 which has been stored in the memory 603, thereby enabling to omit part of the image processing which is necessary to reflect user-set values.

The intermediate image data 145 which has been stored in the memory 603 is inputted to gain correction control (step S150). In the gain correction control (step S150), white balance correction and brightness adjustment are performed. As in equation (8), gain values (gainR, gainG, gainB) are obtained by multiplying gain values for each R, G, and B (wbR, wbG, wbB), which have been converted for gain correction control (step S150) from the user-designated white balance setting by the user-set parameter converter, by a common gain value for each R, G, and B (brightGain) which has been converted for gain correction control (step S150) from the user-designated brightness adjustment setting value by the user-set parameter converter. The image data is multiplied by the gain values (gainR, gainG, gainB) as in equation (9).

$$gainR = wbR \times brightGain$$

$$gainG = wbG \times brightGain$$

$$gainB = wbB \times brightGain \quad (8)$$

$$Rwb = gainR \times R$$

$$Gwb = gainG \times G$$

$$Bwb = gainB \times B \quad (9)$$

The image data, on which white balance has been corrected, is subjected to color optimization in color adjustment control (step S156) using, for example, 3×3 matrix calculation in equation (1), and subjected to gamma conversion in gamma correction control (step S160). The gamma-converted image data is converted (color space conversion) from the RGB signals to luminance-component (Y) signals and color-difference-component (Cr and Cb) signals YCbCr to be subjected to pseudo-color processing and edge enhancement by YC conversion control (step S170). The luminance component Y of the converted signals YCbCr is subjected to luminance noise reduction control (step S191) to suppress granular noise, and thereafter subjected to edge enhancement in sharpness control (step S192). The color-difference components CbCr of the converted signals YCbCr are subjected to median filtering in median control (step S181) for pseudo-color reduction, and subjected to color noise reduction control (step S182) where local color-unbalanced areas are made homogeneous. Last, in a case where the output file format is 8-bit data, the data YCbCr is converted to 8-bit YCbCr data by 16-bit-to-8-bit conversion control (step S195). The converted YCbCr data 199 is subjected to conversion conformable with the output file format in accordance with the user-designated output file format. For an output file format, there are, for instance, JPEG format and TIFF format.

Hereinafter, the 16-bit-to-8-bit conversion control (step S195) is described further in detail. The 16-bit-to-8-bit conversion control step S195 is executed using the LUT shown in equation (10) which has been generated in advance, as similar to equation (4) of the first embodiment.

$$Y8 = YLUT(Y16)$$

$$Cb8 = CbLUT(Cb16)$$

$$Cr8 = CrLUT(Cr16) \quad (10)$$

The generation method of YLUT, CbLUT, and CrLUT is basically similar to the method described in FIGS. 4A, 4B and 10A, 10B of the first embodiment. While a 14-bit value is converted to a 8-bit value in the first embodiment, a 16-bit value is converted to a 8-bit value in the present embodiment. By replacing the 14-bit value in FIGS. 4A, 4B and 10A, 10B described in the first embodiment to a 16-bit value, a LUT can be generated similarly to the control shown in FIGS. 4A, 4B and 10A, 10B.

Third Embodiment

The third embodiment describes general 16-bit-to-8-bit conversion image processing (RGB, 16-bit-to-8-bit conversion).

FIG. 13 shows the control of inputting general 16-bit image data and performing image processing for outputting 8-bit image data. 16-bit TIFF image data 300 is inputted, and in the RGB image processing step S310 tone curve correction, for example, equation (11), is performed on the RGB data.

$$Rt = ToneCurve(Rc)$$

$$Gt = ToneCurve(Gc)$$

$$Bt = ToneCurve(Bc) \quad (11)$$

The 16-bit RGB image data, on which image processing has been performed in the RGB image processing step S310, is converted to 8-bit image data in 16-bit-to-8-bit conversion step S320, and then stored as 8-bit TIFF image data or JPEG image data.

The 16-bit-to-8-bit conversion step S320 is now described further in detail. The 16-bit-to-8-bit conversion step S320 is executed using the LUT shown in equation (12) which has been generated in advance, as similar to equation (4) of the first embodiment.

$$R8 = RLUT(R16)$$

$$G8 = GLUT(G16)$$

$$B8 = GLUT(B16) \quad (12)$$

Figure 14A:
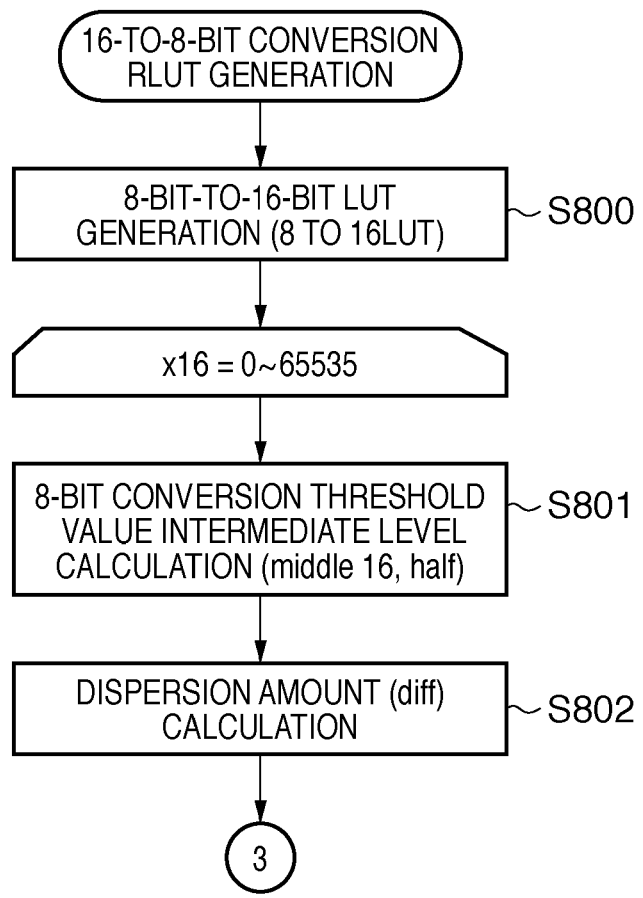
FIGS. 14A and 14B are flowcharts describing 16-bit-to-8-bit conversion RLUT generation control.
Figure 14B:
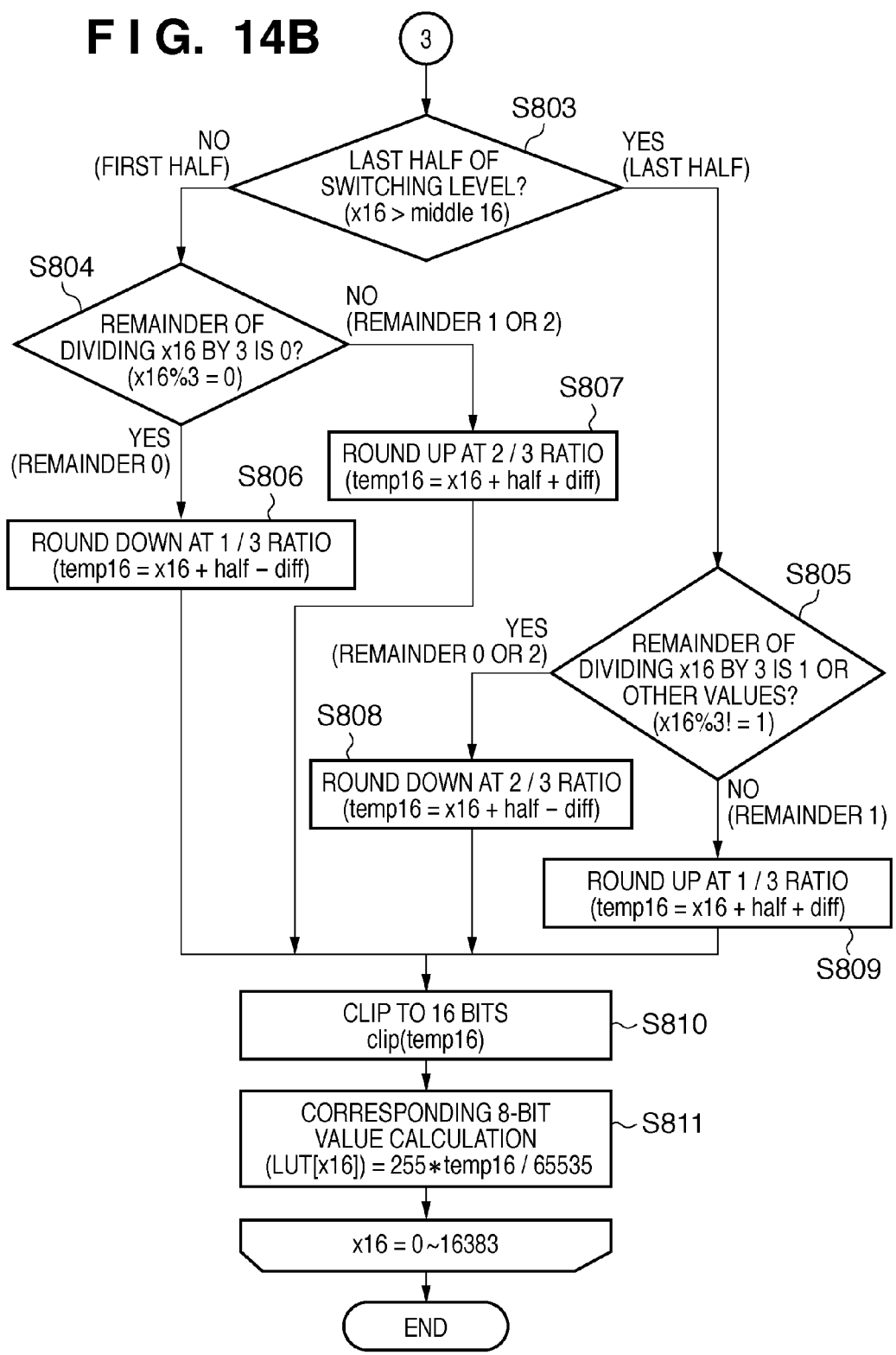
Figure 15:
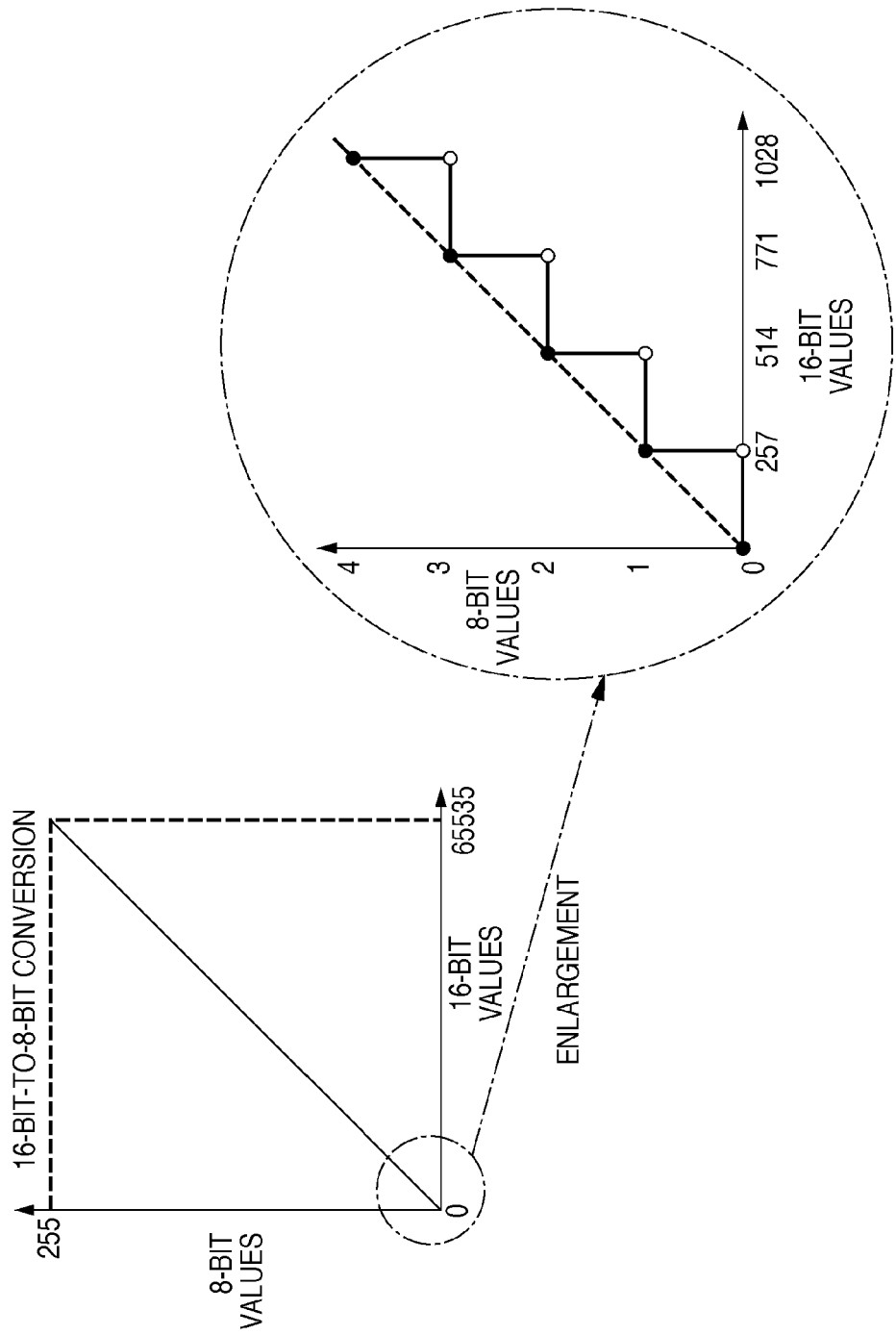
FIG. 15 is a view showing general 16-bit-to-8-bit conversion.

The generation method of RLUT is shown in FIGS. 14A and 14B. The basic flow is similar to the YLUT generation control described in FIGS. 4A and 4B of the first embodiment. While a 14-bit value of the luminance signal Y is converted to a 8-bit value in FIGS. 4A and 4B, a 16-bit value of each R, G, and B data is converted to a 8-bit value in FIGS. 14A and 14B. By replacing the 14-bit value shown in FIGS. 4A and 4B of the first embodiment to a 16-bit value, a LUT can similarly be generated as in the control in FIGS. 4A and 4B. Moreover, equation (7) is modified for 16-bit input data for each R, G, and B as in equation (13). GLUT and BLUT can also be generated similarly to RLUT with the use of a different parameter value diff.

$$\text{diff}\_R(R16) = R16 * \text{aDiff}\_R/65535 + \text{minDiff}\_R$$

$$\text{diff}\_G(G16) = G16 * \text{aDiff}\_G/65535 + \text{minDiff}\_G$$

$$\text{diff}\_B(B16) = B16 * \text{aDiff}\_B/65535 + \text{minDiff}\_B$$

$$\text{aDiff}\_R = \text{maxDiff}\_R - \text{minDiff}\_R$$

$$\text{aDiff}\_G = \text{maxDiff}\_G - \text{minDiff}\_G$$

$$\text{aDiff}\_B = \text{maxDiff}\_B - \text{minDiff}\_B \quad (13)$$

Herein, R16, G16, and B16 are RGB values before tone conversion, and diff_R, diff_G, and diff_B correspond to diff in steps S806 to S809 in FIG. 14B.

Pseudo contours involve bit precision problems and differences in color recognition thresholds which are expressed in the so-called MacAdam ellipses or CIE 2000 color-difference formula. It is assumed that pseudo-contours tend to occur in a place where the visual recognition threshold is small, that is, a place where the MacAdam ellipse is small. Therefore, it can be assumed that giving large dispersion in this color area can improve pseudo contours. In view of this, parameters may vary for each color; for instance, in R and B, parameters may vary depending on the value level (chroma). For instance, values are set as in equation (14).

$$\text{maxDiff}\_R = 128, \text{minDiff}\_R = 32$$

$$\text{maxDiff}\_G = 64, \text{minDiff}\_G = 64$$

$$\text{maxDiff}\_B = 128, \text{minDiff}\_B = 64 \quad (14)$$

Alternatively, dispersion in R and B may be varied in accordance with the value B as in equation (15). For instance, values are set as in equation (16).

$$\text{diff}\_R(R16) = B16 * \text{aDiff}\_R/65535 + \text{minDiff}\_R$$

$$\text{diff}\_G(G16) = B16 * \text{aDiff}\_G/65535 + \text{minDiff}\_G$$

$$\text{diff}\_B(B16) = B16 * \text{aDiff}\_B/65535 + \text{minDiff}\_B$$

$$aDiff\_R = maxDiff\_R - minDiff\_R$$

$$aDiff\_G = maxDiff\_G - minDiff\_G$$

$$aDiff\_B = maxDiff\_B - minDiff\_B \quad (15)$$

$$maxDiff\_R = 128, minDiff\_R = 64$$

$$maxDiff\_G = 128, minDiff\_G = 32$$

$$maxDiff\_B = 128, minDiff\_B = 64 \quad (16)$$

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-017128, filed Jan. 28, 2009, which is hereby incorporated by reference herein in its entirety.

What is claimed is:

1. An image processing apparatus for tone conversion of a color image having s bit (s is an integer which is equal to or larger than 3) to a color image having d bit (d is an integer which is equal to or smaller than (s−2)), comprising:
   a conversion table generation unit configured to generate a conversion table describing a relationship between s-bit tone values and d-bit tone values, the conversion table having dispersion of which level varies in accordance with chroma and luminance of the color image and varies in dependence on a tone value of the s bit; and
   a tone conversion unit configured to convert, before image compression or image file storage is performed and after color space conversion is performed, the color image having s bit to the color image having d bit using the conversion table.

2. The image processing apparatus according to claim 1, wherein the conversion table is different for each signal component of the color image, and bit precision of the color image before the conversion is 14 bits or 16 bits, while bit precision of the color image after the conversion is 8 bits.

3. The image processing apparatus according to claim 2, wherein the signal component of the color image includes luminance component Y and color-difference components Cb and Cr.

4. The image processing apparatus according to claim 2, wherein the signal component of the color image includes R (red), G (green), and B (blue).

5. The image processing apparatus according to claim 4, wherein the larger the B component value, the larger the dispersion level of the conversion table used respectively for R, G, and B components.

6. An image processing method of tone conversion of a color image having s bit (s is an integer which is equal to or larger than 3) to a color image having d bit (d is an integer which is equal to or smaller than (s−2)), comprising the steps of:
   generating a conversion table describing a relationship between s-bit tone values and d-bit tone values, the conversion table having dispersion of which level varies in accordance with chroma and luminance of the color image and varies in dependence on a tone value of the s bit; and
   converting, before image compression or image file storage is performed and after color space conversion is performed, the color image having s bit to the color image having d bit using the conversion table.

7. A non-transitory computer readable storage medium storing a program which causes a computer to execute the image processing method described in claim 6.

8. An image processing apparatus for tone conversion of a color image having s bits to a color image having d bits, the apparatus comprising:
   a conversion table generation unit configured to generate a conversion table describing a relationship between s-bit tone values and d-bit tone values, wherein a dispersion amount of the conversion table varies in accordance with chroma and luminance of the color image and varies in dependence on a tone value of the s bits; and
   a tone conversion unit configured to convert, before image compression or image file storage is performed and after color space conversion is performed, the color image having s bits to the color image having d bits using the conversion table,
   wherein s is an integer which is equal to or larger than 3 and d is an integer which is equal to or smaller than (s−2).

9. The image processing apparatus according to claim 8, wherein the conversion table is different for each signal component of the color image, and bit precision of the color image before the conversion is 14 bits or 16 bits, while bit precision of the color image after the conversion is 8 bits.

10. The image processing apparatus according to claim 9, wherein the signal component of the color image includes luminance component Y and color-difference components Cb and Cr.

11. The image processing apparatus according to claim 9, wherein the signal component of the color image includes R (red), G (green), and B (blue).

12. The image processing apparatus according to claim 11, wherein the larger the B component value, the larger the dispersion level of the conversion table used respectively for R, G, and B components.

* * * * *